Feb. 15, 1944.  M. F. WEIDA  2,342,093
DOUGH MEASURING AND LUMP FORMING MACHINE
Original Filed May 1, 1940  2 Sheets-Sheet 1

INVENTOR
MILLARD F. WEIDA
BY
ATTORNEYS

Feb. 15, 1944. M. F. WEIDA 2,342,093
DOUGH MEASURING AND LUMP FORMING MACHINE
Original Filed May 1, 1940 2 Sheets-Sheet 2
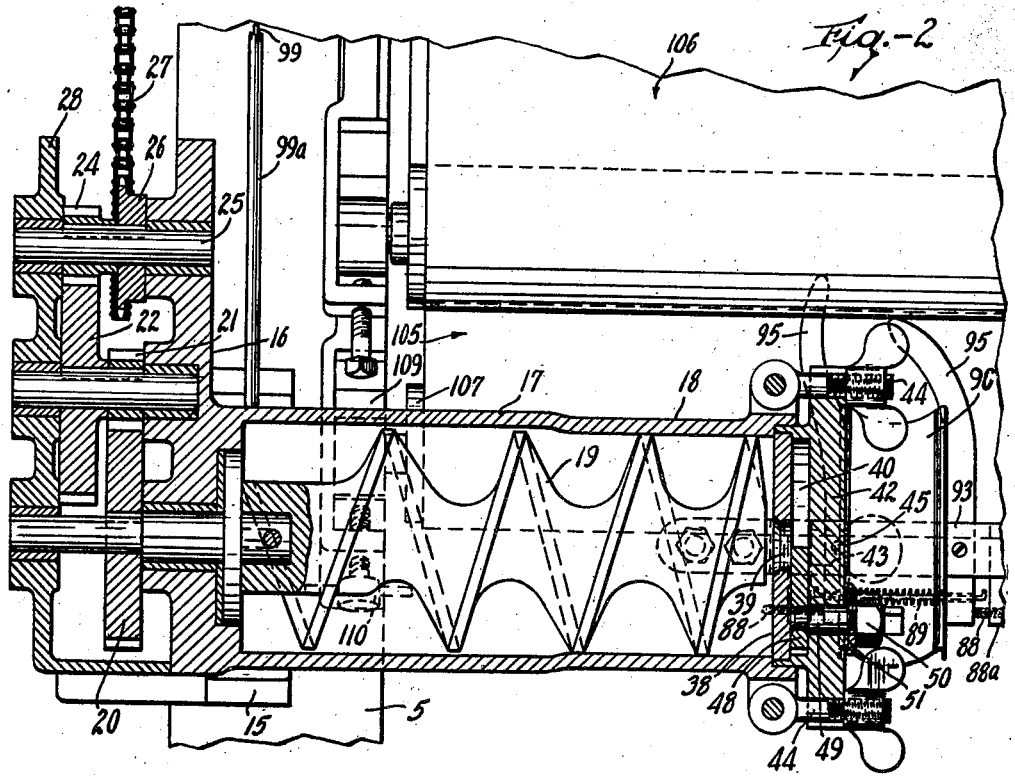
Fig.-2
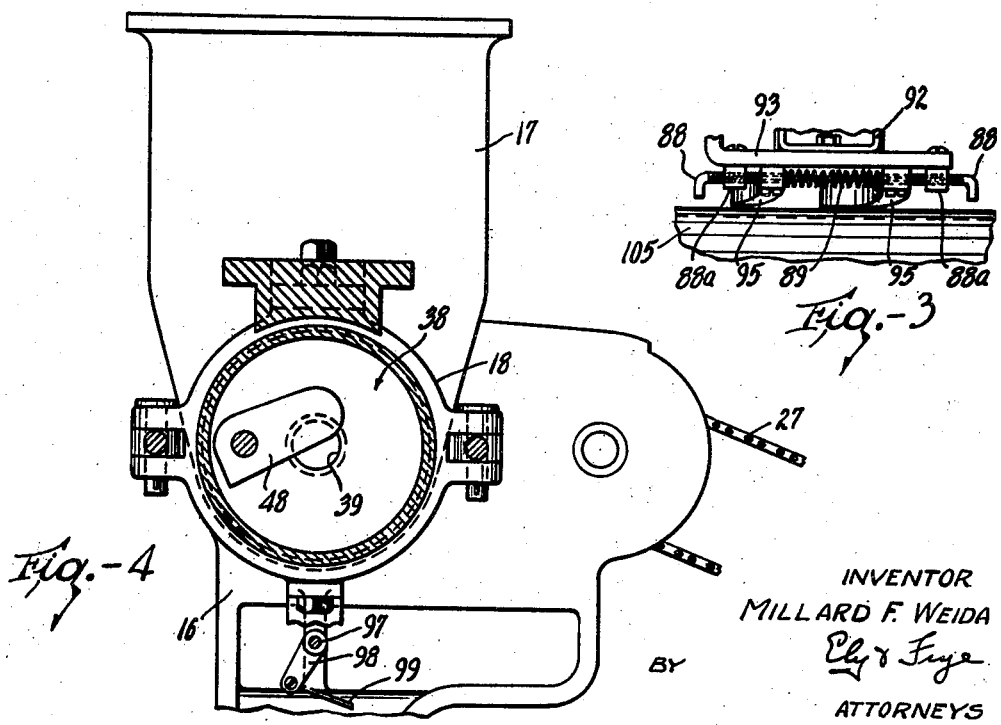
Fig.-3
Fig.-4
INVENTOR
MILLARD F. WEIDA
BY
ATTORNEYS Patented Feb. 15, 1944

2,342,093

UNITED STATES PATENT OFFICE 2,342,093

DOUGH MEASURING AND LUMP FORMING MACHINE

Millard F. Weida, Canton, Ohio, assignor to The Curthalt Company, Canton, Ohio, a corporation of Ohio Original application May 1, 1940, Serial No. 332,796. Divided and this application August 15, 1941, Serial No. 406,991

2 Claims. (Cl. 107—14)

This invention relates to machines designed for accurately measuring lumps of dough and is primarily intended and adapted for use in connection with pretzel forming machines such as shown in United States Patent No. 2,107,749, dated February 8, 1938, to Curtis, or shown in the copending application to this applicant, Serial No. 332,796, filed May 1, 1940, now Patent No. 2,295,246, issued September 8, 1942.

In machines for the purposes set forth, it is essential to efficient and rapid operations that the dough lumps from which the dough stick is formed be of uniform size, as slight variations in the amount of dough to be handled in the pretzel forming mechanism will interfere with its operation. It is also essential that the waste be reduced to the minimum in order to operate more efficiently. The mechanism shown and described herein will form lumps of uniform volume so that the length and diameter of the sticks which are rolled therefrom and pass into the pretzel tying unit are always the same.

While the new invention has been directed to the particular use set forth, it may also be employed for any other uses in which accurate and uniform lumps of dough or other plastic material may be employed.

The best known and preferred form of the invention is shown and described herein, but it will be understood that changes and modifications may be made without departing from the essentials of the invention as set forth in the appended claims.

This application is a division of my prior application Serial No. 332,796, above identified.

In the drawings:

Fig. 2 is a horizontal section on the line 2—2 of Fig. 1.

Fig. 3 is a detail of the means for adjusting the rails which guide the dough lump to the rolling belts.

Fig. 4 is a section on the line 4—4 of Fig. 1 showing the adjustable gate or valve by which the amount of dough in each lump is regulated, thereby controlling the stick dimensions.

Figure 1:
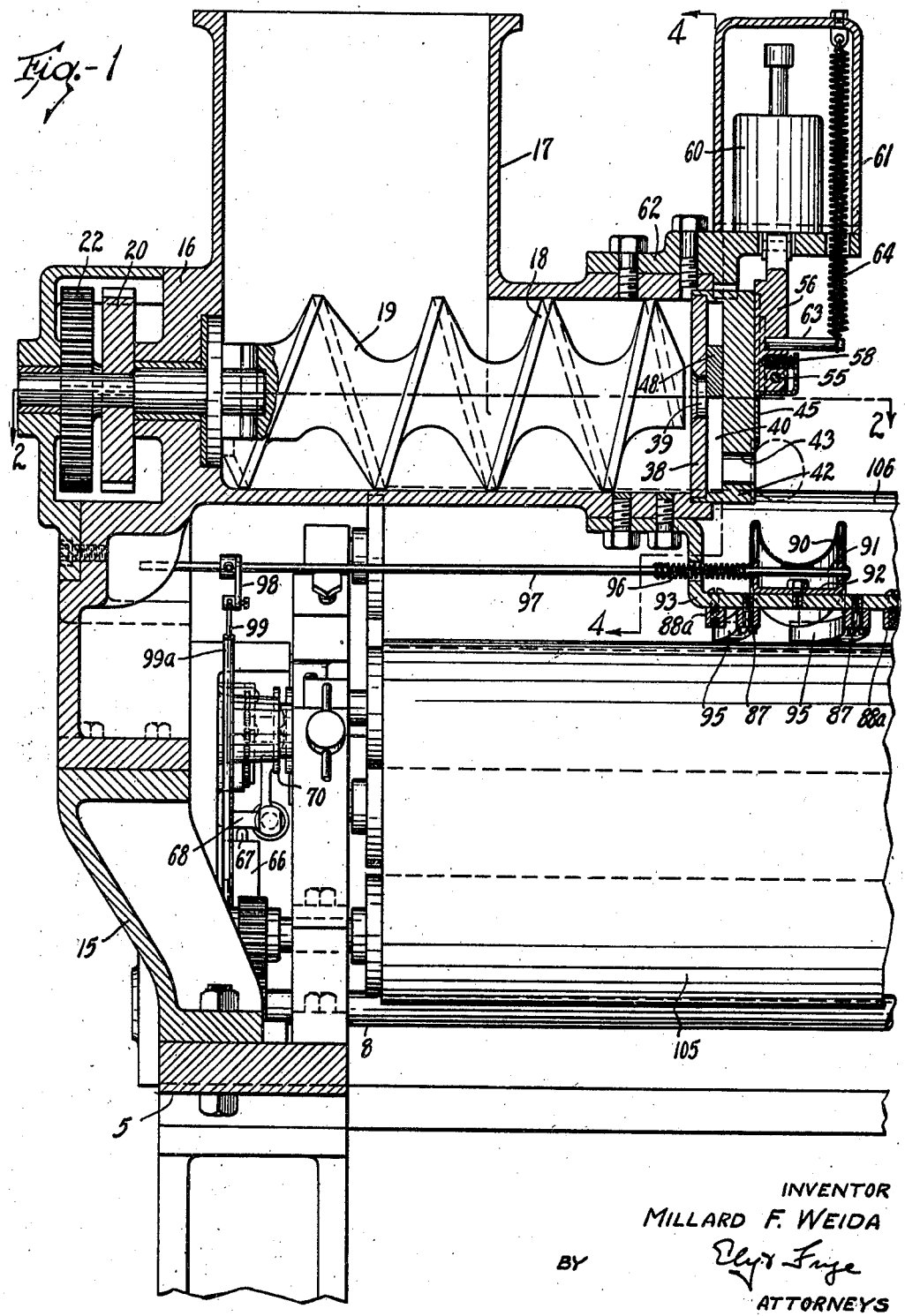
Fig. 1 is a vertical section through the dough lump or "gob" forming mechanism showing the means by which the accurately measured lumps of dough are formed. This view also shows the ends of the belts which roll the gobs into the sticks which are subsequently delivered to the pretzel tying unit or head, not shown in this application.

The dough working and lump measuring and forming mechanism is a unit of a single composite machine shown in the parent application referred to above, and reference is made to such application for a more complete disclosure of the entire device, it being sufficient for the purpose of the present application to state that after the dough lump is cut from the end of the stream as it flows from the unit shown herein, it passes between two rolling belts which transform it to stick form and thence to the tying unit. Mechanism is provided which will permit the lump forming device to be adjusted while the entire organization is in operation, thus facilitating the entire operation.

The numeral 5 represents the bed plate of the entire machine on which is located a pedestal 15 to the upper end of which is secured a casting 16, the upper portion of which is formed as a hopper 17 from one side of which extends the barrel 18 in which is located the dough mixing and feeding worm 19 which forces the dough from the hopper toward the discharge end of the barrel. It will be noted that the pitch of the worm is reduced toward its discharge end so that the dough is compacted at the discharge point. The opposite end of the worm projects through the casting and is provided with a gear 20 meshing with pinion 21 fixed to intermediate gear 22 which, in turn, is driven by a pinion 24 on the countershaft 25. To this shaft is secured the sprocket pinion 26 which is driven by the chain 27.

As the dough is moved forwardly by the worm 19, it is compacted against a plate or baffle 38 located at the discharge end of the barrel and provided with a centrally located port 39. This baffle 38 is not the outer wall of the extruding machine, but is spaced a short distance therefrom to provide a narrow pressure chamber 40, the opposite wall of which is formed by a flanged cap 42 in which the discharge port 43 is located. This cap is clamped on the outside of the extruding machine by the swinging screw-threaded clamps 44 which hold the cap and plate 38 in position, but permit removal for cleaning. Because of the relatively narrow width of the chamber 40, the surface area thereof is relatively large as compared to its volumetric capacity, with the result that there is substantial frictional resistance to the passage of dough through said chamber. A knife 45, to be described in detail, moves over the outer surface of the cap and cuts off the individual lumps of dough at the proper timed intervals, one of said lumps being shown in dotted lines in Fig. 2.

The objection to prior dough-lump forming machines has been irregularity of operation, it having been impossible heretofore to secure strictly uniform lumps of dough. The successful operation of the entire machine is dependent in a large measure upon the regular delivery to the pretzel forming machine of uniform sticks of dough and the uniformity in sticks depends upon the accuracy of the lump-forming means. In former lump forming and cutting means the dough has tended to be discharged from the forcing machine head irregularly and in spurts or pulsations. This has resulted in the formation of non-uniform lumps.

This arrangement shown herein has overcome that difficulty and in its operation delivers a steady stream of uniform size and weight. It will be observed that the discharge opening 43 is not in alignment with the opening 39 in the baffle 38 so that dough moving from one opening to the other must traverse a sharply angular course that supplements the frictional resistance aforementioned in opposing the free flow of the dough, with the result that the chamber 40 operates as a sort of accumulator or pressure chamber in which the dough is compacted by the force of the feed screw. This intermediate of antechamber in the head of the dough-extruding machine eliminates all of the pulsations and irregularities in the dough movement and maintains a uniform pressure back of the discharge opening 43, so that the stream of dough as it issues therefrom is constant in speed and volume. As the knife 45 is operated at exact timed intervals, each gob or lump is exactly like every other gob and consequently the sticks delivered to the tying unit are identical in weight, length and diameter.

In order to vary the size of the gob, an adjustable gate 48 is located between the plate 38 and the cap 42 being fixed to a pin 49 rotatable in the plate and held in position by the nut 50 and washer 51. The amount of dough which passes into the pressure chamber 40, and consequently the size of the lumps for fixed cutting intervals, is determined by the area of the opening 39 which is exposed by the gate 48. This determines the length of a pretzel stick of a given diameter.

The means for operating the knife 45 will now be described. This knife moves over and against the face of the cap 42 and is pivoted at 55 to a knife slide 56 guided for vertical movement on the cap. The knife is formed with an angular extension shown in Fig. 1 and a coil spring 58 is seated in the face of the knife slide and presses the cutting edge of the knife against the face of the cap so as to make a clean cut across the discharge opening 43.

The knife is actuated to make a quick cutting stroke and return by a solenoid 60 mounted in a solenoid housing 61 secured to a bracket 62 mounted on the casting 18. The slide 56 has an extension which passes into the solenoid and is provided with a pin 63 connected by the coil spring 64 with the housing. When the solenoid is energized, the slide 56 is moved downwardly, passing the knife over the discharge opening 43 and is immediately returned by the spring.

The solenoid is momentarily energized by a switch contained in a box 66, the actuating pin 67 of which is yieldingly pressed upwardly against the horizontal arm of a pivoted lever 68, the other end of which bears against a timer disk 70.

The disk 70 is the means by which the operation of the knife is controlled from the pretzel tying mechanism so that the gob cutting and delivering mechanism may be brought into accurate stepped relation to the tying unit. The details of this device are given in the parent application, it being sufficient to say here that by accurately regulating the timed relation of the gob forming mechanism with the tying mechanism, it is possible to secure the efficient and accurate operation of the entire organization.

The gob of dough cut off by the knife 45 falls into a delivery trough 90 secured to a shaft 91 pivoted in a bracket 92 carried on an arm 93 extending from the under side of the casting 17. Mounted on pivots 87 below the arm 93 are two guiding rails 95 which are pivotally adjustable so as to direct the gob to the exact center line of the lower rolling belt. To adjust the rails, set screws 88 are threaded in lugs 88ᵃ and bear against the rear ends of the rails, a light coil spring 89 holding the rails against the set screws.

It is advisable to have means by which the gob of dough may at times be diverted from the rolling belts, and for this purpose the trough can be thrown backwardly so that the gobs fall behind the rolling belts. To do this, the shaft 91 is fixed to a coil spring 96 which is, in turn, fixed to a rotating operating rod 97, the far end of which is located in a recess in the frame. An arm 98 is secured to the rod and connected to a second rod 99 which extends to the front of the machine, being guided in a tube 99ᵃ secured to the frame.

The rod 99 is carried to a convenient point, preferably near the pretzel tying mechanism, where it can be manipulated by the operator in the event any mishap occurs in the operation which would make it necessary to raise the trough and discharge the gobs of dough directly therefrom.

The dough stick rolling belts may be of any desired form or design, but, as shown here, consist of a lower belt 105, to which the dough lumps are delivered, and an upper belt 106. The lower belt is extended at its upper end to a point below the trough 90 to receive the gob of dough. For a more complete description of the rolling belts, attention is directed to the parent application.

The operation of the dough lump or "gob" forming mechanism is automatic and as long as the hopper is filled with dough uniform lumps will be delivered at exact timed intervals to the rolling belts.

What is claimed is:

1. A machine for measuring and forming lumps of dough of uniform size comprising a hopper, a continuously rotated screw within the hopper, a discharge port in the closed end of the hopper toward which the dough is fed by the screw, means for eliminating pulsations in the stream of dough delivered by the screw comprising a baffle plate located in the hopper between the end of the screw and the discharge port, said baffle plate having a restricted opening out of register with the discharge port, the space between the baffle plate and the end of the hopper constituting an accumulator chamber in which the dough is retained under pressure and by which a constant pressure is maintained on the dough at the discharge port, and a cutter movable at regular intervals across the discharge port.

2. A machine for measuring and forming lumps of dough of uniform size comprising a hopper, a continuously rotated screw within the hopper, a discharge port in the closed end of the hopper toward which the dough is fed by the screw, means for eliminating pulsations in the stream of dough delivered by the screw comprising a baffle plate located in the hopper between the end of the screw and the discharge port, said baffle plate having a restricted opening out of register with the discharge port, means to adjust the area of the opening in the baffle plate, the space between the baffle plate and the end of the hopper constituting an accumulator chamber in which the dough is retained under pressure and by which a constant pressure is maintained on the dough at the discharge port, and a cutter movable at regular intervals across the discharge port.

MILLARD F. WEIDA.